Feb. 18, 1941.  W. E. SLOAN  2,231,959
THROTTLING DEVICE
Filed Sept. 1, 1938
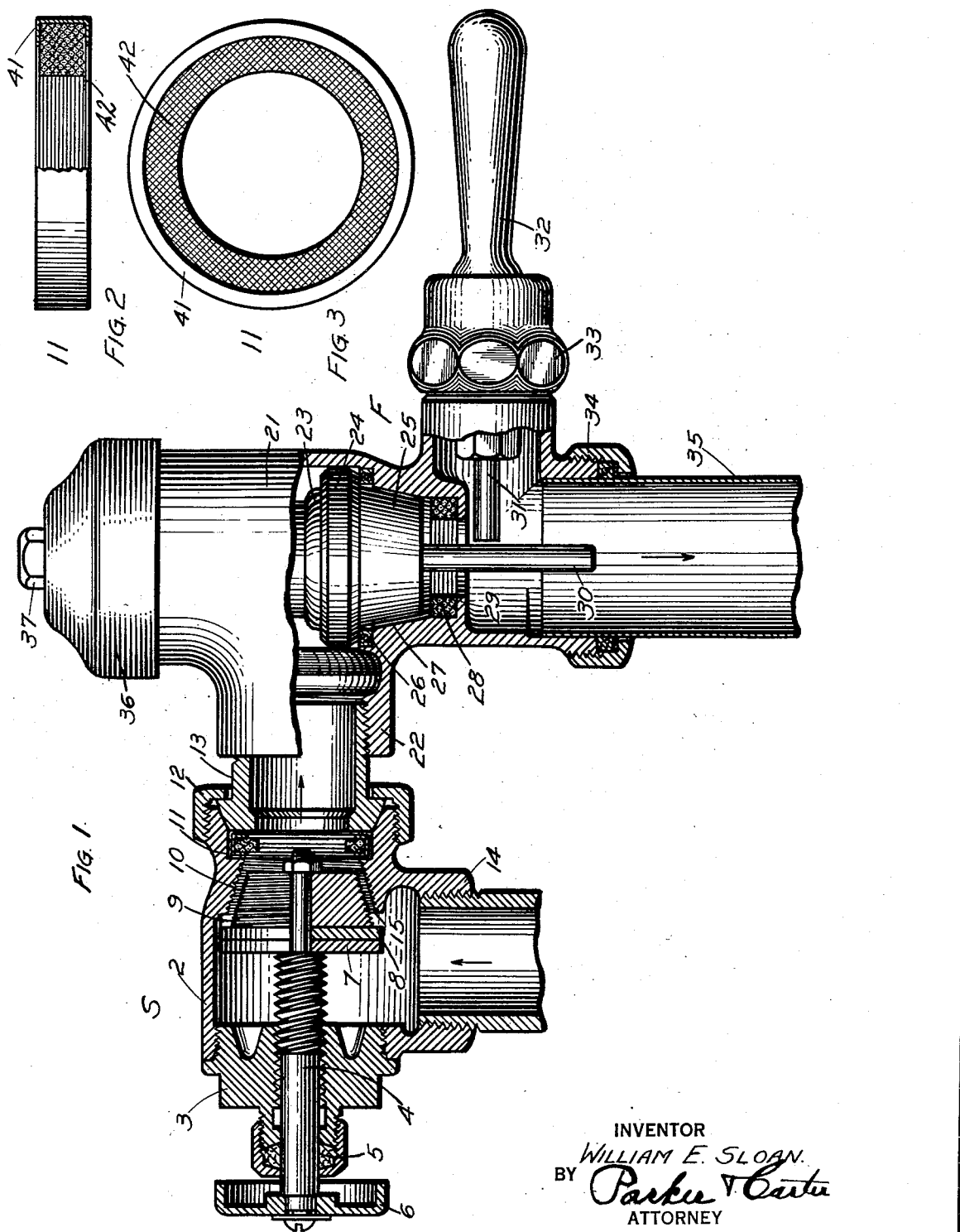
INVENTOR
WILLIAM E. SLOAN.
BY Parker & Carter
ATTORNEY Patented Feb. 18, 1941

2,231,959

UNITED STATES PATENT OFFICE 2,231,959

THROTTLING DEVICE

William E. Sloan, River Forest, Ill., assignor to Sloan Valve Company, Chicago, Ill., a corporation of Illinois Application September 1, 1938, Serial No. 227,958

11 Claims. (Cl. 137—93)

This invention relates to throttling devices, and it has for its main object the production of a new and improved throttling device which will permit the quiet throttling of a relatively high rate of flow from a high-pressure source of liquid.

A further object is to provide a throttling device of the above character which can be readily adjusted to secure a desired rate of flow from any pressure ranging from low to high.

One of the outstanding features of the invention is that it employs a cartridge or element composed of porous or finely divided material and located on the down-stream side of the throttling passageway or orifice, to receive the high velocity jet and break it up quietly and divert it into the slowly moving stream. This impact element is conveniently made up of a number of layers of woven wire gauze, but other constructions of this element may be employed.

A further feature of the invention is that the throttled liquid is caused to flow between parallel (or nearly so) surfaces which are caused to overlap and be spaced from one another more or less according to the supply pressure and the desired rate of flow. The discharged liquid thus has the form of a thin sheet which strikes the silencing impact member after passing through the adjustable throttling passageway or orifice.

In one embodiment, the adjustable throttling piece takes the form of a truncated cone with the smaller end down-stream, cooperating with an inside surface portion of the passageway of similar shape.

This tapered form of the device enables the width of the passageway between the two cooperating throttling surfaces to be widened for lower pressures and to be narrowed for higher pressures, whereby an effective control can be utilized with less relative movement of the parts than in other shapes, such as cylindrical.

Although this invention is of general application wherever quiet throttling is desired, the invention has been illustrated as applied to a flush valve, and to the associated throttling device, for flushing a closet bowl.

Other objects and features of the invention will appear more fully upon a further perusal of this specification, in connection with the accompanying drawing forming a part thereof.

Referring now to the drawing, comprising Figs. 1 to 3, Fig. 1 shows a throttling device or stop valve S interposed in a supply line to a flush valve F, while Figs. 2 and 3 show enlarged-scale views of the silencing impact member 11 used in the throttle or stop valve S.

Referring now particularly to Fig. 1, the throttle or stop valve S has the casing 2, provided with a bonnet opening at one end, closed by the bonnet member 3. The control stem 4 is screw-threaded into the bonnet member 3 to enable axial adjustment to be made, the escape of water around stem 4 being prevented by the adjustable packing 5. A handle 6 is provided to facilitate turning of the stem 4.

The throttle piece or plug 9 is fitted onto the reduced down-stream end of the stem 4 and is held onto the stem by the nut 16. The seat washer 8 is clamped between the back plate 7 and the throttle piece 9. This seat washer cooperates with the annular seating surface 15 when the valve S is to be closed off entirely, and it may be composed, for example, of lead, relatively hard metal-reinforced rubber, or of still harder rubber without a metal reinforcement. The tapered, fixed throttling port 10 is provided in the casing or body 2, with respect to which the throttle piece 9 is adjusted to secure the desired rate of flow. The water thus discharged, in the form of an annular sheet or hollow contracting cone, is caused to strike the up-stream surface of the porous or finely divided silencing member 11. The member 11 is removably held in position in the illustrated body recess by the up-stream end of the union nipple 13, the nipple 13 being held in contact with the outlet end of the throttle valve S by the coupling nut 12. By this arrangement, the flush valve F can be readily detached from the throttle or stop valve S by merely loosening the union nut 12, and the silencing member 11 can then be removed for inspection or replacement.

The flush valve F may be similar generally to the flush valve illustrated in my prior Patent Number 2,046,004, granted June 30, 1936. The flush valve F includes the casing or body 21 provided with a sealing cap (not shown) and with a finishing cap 36, held in place by the cap-nut 37. The piston 23 is mounted for reciprocating movement up away from the seat 26 to enable a flushing flow to occur, and back down to the seat to terminate the flush. The seat portion 24, secured to the lower end of the piston 23, is provided with a tapered throttle portion 25, corresponding to the throttle piece 9 of the valve S. The movement of this valve away from its seat 26 to initiate a flushing operation and back to its seat when the flushing operation has been accomplished is controlled hydraulically, as in my patent hereinbefore referred to, responsive to an unseating and reseating of the relief valve (not shown), whose stem 30 extends down from the piston assembly through the central hollow portion of the throttle piece or plug 25. Actuation of the relief-valve stem 30 is accomplished by the handle plunger 31, controlled in turn by the handle 32, which is held in place by the collar member 33.

The discharged liquid is directed through the flush tube 35 to an associated closet bowl or other desired receptacle, the tube 35 being secured, in a slip joint arrangement, to the discharge end of the flush valve F by the compression coupling nut 34.

It is to be noted that the body portion 27 below the seat 26 has been given a taper corresponding to the taper of the plug 25 to enable the flow of liquid to be progressively reduced as the piston of the flush valve returns to the main seat 26. The annular or cone-like stream thus discharged between the surface 27 and the plug 25 as the flush valve nears its seat is received by the silencing member 28, retained by the ledge 29, whereby the fast-moving water is gently and quietly divided and broken up into a uniform slowly moving stream in the discharge tube 35.

Referring particularly to Figs. 2 and 3, the silencing element 11 of the stop valve S is shown in front and bottom views, respectively. This element or cartridge is composed of a number of separate, superposed washers, stamped from woven wire gauze. These washers collectively are referred to in Figs. 2 and 3 as 42, and they are held in assembled relation by the sheet-metal retainer 41, as shown.

Good results have been had when the sheet material from which the washers are stamped is commercial thirty-mesh (thirty wires to the inch) woven Monel-wire screen. For best results, the washers should not be compressed in the retainer 41, but should lie loosely therein to enable water penetrating the layers of screen to pass out between them. Additionally, this loose construction renders the element less subject to being clogged by foreign matter carried by the flowing stream.

It should be noted that the element is reversible, being alike, top and bottom. The clamping edges of member 41 are narrow to expose only the silencing screen portion 42 to the high velocity jet or annular sheet, as may be seen in Fig. 1.

The silencing element 28 of the flush valve F need not be removable from the discharge end of the valve, for the water can be shut off at the stop valve S to enable the flush valve to be taken apart, and the piston 23 removed. Then the screen washers forming element 28 can be lifted off the ledge 29 and removed through the top of the valve casing 21. The screens of this element, therefore, do not have a retainer such as 41 of Figs. 2 and 3.

The throttle or stop valve S is shown adjusted to furnish a rate of flow to the flush valve F on the order of twenty-five gallons a minute from a supply pressure of about sixty pounds to the square inch. For higher supply pressures, the handle 6 is turned to bring the throttle piece 9 further into the cooperating tapered surface 10, both increasing the overlap or length of the restricted passageway and narrowing the restricted passageway. On the other hand, adjustment can be made in the opposite direction to widen the crevice and reduce the length of passageway for successively lower pressures.

With the stop adjustment as illustrated and with a medium high supply pressure of about sixty pounds as above mentioned, a flushing operation of the flush valve F is about as follows:

When the handle 32 is actuated, the plunger rod 31 engages the stem 30 to unseat the relief valve (not shown) contained in the piston 23, the piston assembly starts to move upwardly and continues until the limit of the stroke is reached, at which time the bottom of the tapered plug or throttling piece 25 may be about on a level with the main seat 26, following which the handle 32 is released to permit the relief valve of the flush valve to reseat, resulting in the parts being returned slowly to the position shown in the drawing.

When the piston of the flush valve F is first moved off the seat 26, there is at first a very small crevice or passageway between the tapered plug 25 and the cooperating wall portion 27, allowing only a relatively small rate of flow to occur. This relatively small rate of flow occurs at high velocity because the rate of flow at that time through the adjusted opening in the stop valve S is sufficiently larger than the small opening in the flush valve that most of the pressure drop occurs between the inlet and outlet of the flush valve F. During this rather brief condition, as the flush valve is rapidly opening, the impact of the jet velocity through the control orifice of the flush valve is received and effectively silenced by the screen-washer assembly or silencing element 28.

When the flush valve has opened sufficiently that the orifice therethrough is larger than the adjusted orifice in the throttle or stop valve S, the pressure drop is largely through the valve S, and only low pressure needs to be handled by the flush valve F. The low pressure flow occurring from then on through the flush valve F is not conducive to noise. From this point on, until the flush valve is again about to close, the tendency toward noisiness is in the stop valve S, where the greatest pressure drop and hence the greatest jet velocity obtains. The high velocity jet now being discharged between the surfaces 9 and 10 in the valve S is received and quietly dissipated by the silencing element 11. The device S thus quietly supplies low-pressure water to the flush valve F from the high pressure supply while the flush valve F is substantially open.

Later, after the flush valve F has fully opened and has slowly moved toward its closed position until it begins to restrict and control the flow, substantial back pressure begins to be built up at the inlet of the flush valve F, and consequently at the outlet or discharge end of the throttle valve S. From this point until the flush valve F seats, there is again little or no tendency for noise production in the valve S, for the tendency at noise production has been transferred back to the flush valve F, and the flush tvalve F is operating at very nearly full supply pressure. The silencing element 28 again receives the full jet impact from the high velocity flow through the narrowing orifice of the closing flush valve, and quietly merges it with the slow-moving discharge stream. By the time the moving portion of the flush valve has neared and is about to engage the main seat 26, the passageway between tapered surfaces 25 and 27 has been narrowed to only a few thousandths of an inch, and the rate of flow has accordingly been so reduced that the seating is accomplished in substantial silence.

It should be noted that surfaces 9 and 10 in valve S are provided with roughening which may conveniently take the form of horizontal scoring or threading. A roughening similar to that produced by eighty threads to the inch, with a ninety-degree included angle and a slightly flattened top, has been found to be quite satisfactory, although other forms of roughening have been tried with success. The value of the roughening on the surfaces 9 and 10 seems to reside in the fact that it reduces the maximum jet velocity attained, thereby enabling higher pressures or greater rates of flow to be broken up quietly by the silencing element 11. Good results have been obtained in the valve S with the surfaces 9 and 10 smooth, but, for a given rate of flow, the device will not then operate quietly from as high a supply pressure as when the said surfaces 9 and 10 are substantially roughened.

The surfaces 9 and 10 may have the same taper, or the two tapers may differ slightly. Good results have been obtained when the tapers are such that the surfaces diverge down-streamward by about a degree and a half, and there is reason to believe that this divergence is beneficial to the extent that the area through the restricted portion then is substantially uniform from inlet to outlet in a chosen high pressure setting, whereby the velocity of the discharged annular sheet is somewhat less than when the two tapered surfaces are exactly parallel.

With respect to the tapered surfaces 25 and 27 of the flush valve F, it was found unnecessary to provide roughening on either of these surfaces for the quiet throttling of pressures up to about one hundred pounds to the square inch, for some benefit is obtained from the velocity and pressure reduction at the throttle valve S until the two tapered surfaces are very close to one another, by which time the smooth-wall friction becomes a somewhat substantial factor in limiting the discharge velocity. Very good results are obtained when the surfaces 25 and 27 are finished by means of high-speed or rough tooling, without special care being taken to produce a perfectly smooth or highly polished surface.

What I claim is:

1. In a throttle, a casing having a passageway therethrough, a throttle device adjustable more or less within said passageway to control the discharge rate, there being an internal annular ledge or shoulder surrounding said passageway in the path of the jet discharge through the adjustable orifice from a high pressure source of fluid, and an annular element of finely divided material supported on said ledge to receive the impact of the jet and divert it quietly into a slowly moving stream.

2. In a throttle, a casing having a port therein, a throttle piece adjustable more or less within said port to control the discharge therethrough, said casing being recessed beyond said port to provide an abrupt enlargement therein, a union piece removably secured to the discharge end of said throttle device forming an annular shoulder opposed to the shoulder formed by the said enlargement into which the said port opens, and a washer-like silencing element held in place in the said recess between the two said shoulders, said washer-like element being composed of foraminous material and having an opening therethrough smaller than said port, but of an area larger than the net area through said port and around said throttle piece whereby said foraminous material receives the jet impact when high pressure fluid is being throttled and effectively silences the throttling operation, while the fluid is free to move quietly and unrestrictedly through said opening following the impact thereof on said foraminous element.

3. A quiet flow-regulating device for fluid, comprising means providing a conduit, a body located in and spaced from said conduit, said body and conduit having concentric conical forms with similar apex angles for providing an annular passage space, means for relatively moving said conduit and body axially for varying the said annular passage space, and means including an internal annular ledge of finely divided or foraminous material located down-streamward of said passage for receiving and breaking up the annular discharge jet.

4. A quiet flow-regulating device for fluid, comprising means providing a conduit, a body located in and spaced from said conduit, said body and conduit having concentric conical forms with similar apex angles for providing an annular passage space, means for relatively moving said conduit and body axially for varying the said annular passage space, means including irregularities or roughening on at least one of the walls defining said passage space for substantially reducing the velocity of the jet discharged through said passage space, and means including an annular ledge of finely divided or foraminous material located down-streamward of said passage space for receiving and breaking up said reduced-velocity jet.

5. A quiet flow-regulating device for fluid, comprising means providing a conduit, a body located in and spaced from said conduit to provide an annular passage space, means for relatively moving said conduit and body axially for varying the length of said annular passage space, means including irregularities or roughening on at least one of the walls defining said passage space for substantially reducing the velocity of the jet discharged through said passage space, and means including an annular ledge of finely divided or foraminous material located down-streamward of said passage space for receiving and breaking up said reduced-velocity jet.

6. In a quiet controlling stop valve, a casing having an inlet opening and a discharge opening, said openings being in communication through a circular port tapering toward said discharge opening, a throttle piece in said casing having a taper similar to that of said port and having the smaller end thereof pointing toward said discharge opening, means including a valve stem extending through and operable from the outside of said casing for adjusting said throttle piece axially of said tapered port to control the rate of flow by an adjustment of the spacing between said throttle piece and the tapered wall of said port, and an internal annular ledge of finely divided liquid pervious material surrounding the down-stream end of said port in position to receive and quietly break up the discharge jet.

7. In a quiet flush valve, a casing having an inlet opening and a discharge opening, said openings being in communication through a circular port tapering toward said discharge opening, a hydraulically controlled valve assembly in said casing reciprocable axially of said port between a closed and an open position, a throttle piece in said casing reciprocable with said valve assembly, said throttle piece having a taper similar to that of said port and being positioned closely within said port when the valve assembly is in closed position, and an internal annular ledge of finely divided liquid pervious material surrounding the downstream end of said port in position to receive and quietly disperse the high-velocity jet discharge as the valve assembly is moving toward closed position and the flow passageway through said port is being restricted by the movement of said throttle piece into close association with the wall of said port.

8. In a quiet throttling device, structure providing a restricted passage for the jet discharge of liquid, and a plurality of superposed layers of liquid-pervious sheet material interposed in the discharge path to receive the impact of the discharged jet or stream, said layers of sheet material being so positioned with respect to the location and direction of the jet discharge that the jet discharge tends to pass through the layers successively, said device being provided with a relatively unrestricted passage by-passing said layers, through which by-passing passage the liquid discharged through said restricted passage may pass freely and unrestrictedly after being slowed up and diverted by said layers.

9. In a quiet throttling device, structure providing a conduit for liquid and providing a restricted passage through an intermediate portion of said conduit for the jet discharge of liquid, silencing means comprising superposed layers of liquid-pervious sheet material positioned downstreamward of the restricted passageway so as to receive the impact of the discharged jet or stream on the most upstreamward one of the said superposed layers in a direction leading through said layers successively, there being a free and unobstructed passage through the portion of said conduit downstreamward of said restricted passageway through which the general body of liquid through said restricted passage is free to pass relatively slowly around the said superposed layers upon being diverted thereby without being forced to be filtered or strained through the said layers of liquid-pervious material.

10. In a throttling device, an orifice adjustable to produce a restricted jet-like discharge of fluid from a high pressure source, a ledge or baffle interposed in the path of jet discharge, and a plurality of layers of finely-divided liquid-pervious sheet material superposed on said ledge or baffle to receive the jet impact and to divert the flow quietly into a slow-moving stream, said layers of sheet material being so positioned that the jet discharge strikes the most upstreamward one thereof and proceeds through said layers successively until stopped by said ledge or diverted by the baffling effect of said liquid-pervious layers.

11. In a throttling device, an orifice for producing a restricted jet-like discharge of fluid from a high pressure source, a plurality of layers of liquid-pervious sheet material and means for holding them so positioned in the direct path of the jet that the jet discharge strikes the most upstreamward one thereof in a direction extending through said layers successively, and so positioned that the fluid carried through one or more of said layers can change direction and pass freely to one side and escape between adjacent layers.

WILLIAM E. SLOAN.